United States Patent
Moriguchi et al.

(10) Patent No.: US 10,433,083 B2
(45) Date of Patent: Oct. 1, 2019

(54) AUDIO PROCESSING DEVICE AND METHOD OF PROVIDING INFORMATION

(71) Applicant: YAMAHA CORPORATION, Hamamatsu-shi (JP)

(72) Inventors: Shota Moriguchi, Tokyo (JP); Yuki Seto, Tokyo (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/503,500

(22) PCT Filed: Aug. 20, 2015

(86) PCT No.: PCT/JP2015/073400
§ 371 (c)(1),
(2) Date: Feb. 13, 2017

(87) PCT Pub. No.: WO2016/031673
PCT Pub. Date: Mar. 3, 2016

(65) Prior Publication Data
US 2017/0245069 A1    Aug. 24, 2017

(30) Foreign Application Priority Data

Aug. 26, 2014 (JP) .................... 2014-171320

(51) Int. Cl.
*H04R 27/00* (2006.01)
*H04R 3/04* (2006.01)
(Continued)

(52) U.S. Cl.
CPC ............. *H04R 27/00* (2013.01); *H04B 11/00* (2013.01); *H04R 3/04* (2013.01); *H04R 3/12* (2013.01)

(58) Field of Classification Search
CPC . H04R 27/00; H04R 3/04; H04R 3/12; H04B 11/00
(Continued)

(56) References Cited

U.S. PATENT DOCUMENTS 3,263,207 A * 7/1966 West .................. H04B 11/00
                                                   330/298
5,615,301 A    3/1997 Rivers
(Continued)

FOREIGN PATENT DOCUMENTS

CN    1494714 A    5/2004
EP    1457971 A1   9/2004
(Continued)

OTHER PUBLICATIONS

Office Action issued in Japanese Application No. 2017-152039 dated Aug. 29, 2017. English translation provided.
(Continued)

*Primary Examiner* — Paul Kim
*Assistant Examiner* — Douglas J Suthers
(74) *Attorney, Agent, or Firm* — Rossi, Kimms & McDowell LLP

(57) ABSTRACT

An audio processing device has an information extractor that extracts identification information from a first audio signal in a first frequency band that includes an audio component of a sound for reproduction and an audio component including the identification information of the sound for reproduction and a signal processor that generates a second audio signal that includes the identification information extracted by the information extractor and that is in a second frequency band higher than the first frequency band, with a sound represented by the second audio signal being emitted from a sound emission device.

15 Claims, 6 Drawing Sheets

(51) Int. Cl.
*H04R 3/12* (2006.01)
*H04B 11/00* (2006.01)

(58) Field of Classification Search
USPC .................................................. 381/77, 56
See application file for complete search history.

(56) References Cited

U.S. PATENT DOCUMENTS

| | | |
|---|---|---|
| 6,542,200 B1 | 4/2003 | Barcy et al. |
| 7,415,407 B2 | 8/2008 | Naruse |
| 7,505,823 B1 | 3/2009 | Bartlett et al. |
| 7,957,977 B2 | 6/2011 | Zhao et al. |
| 8,462,950 B2 | 6/2013 | Jacobs |
| 8,676,273 B1 | 3/2014 | Fujisaki |
| 8,989,883 B2 | 3/2015 | Shah et al. |
| 2001/0055391 A1* | 12/2001 | Jacobs ............... G06Q 30/0601 380/241 |
| 2002/0032037 A1 | 3/2002 | Segawa |
| 2002/0111141 A1 | 8/2002 | Furukawa |
| 2004/0220995 A1* | 11/2004 | Tsutsumi ............. H04W 88/04 709/200 |
| 2008/0015860 A1 | 1/2008 | Lane et al. |
| 2008/0027734 A1 | 1/2008 | Zhao et al. |
| 2008/0140422 A1 | 6/2008 | Hovestadt et al. |
| 2008/0153540 A1 | 6/2008 | Brown |
| 2009/0074240 A1 | 3/2009 | Srinivasan |
| 2009/0233582 A1 | 9/2009 | Suzuki et al. |
| 2010/0222000 A1 | 9/2010 | Sauer et al. |
| 2010/0225808 A1 | 9/2010 | Mears |
| 2010/0245581 A1 | 9/2010 | Koyama et al. |
| 2011/0150240 A1 | 6/2011 | Akiyama et al. |
| 2012/0069131 A1 | 3/2012 | Abelow |
| 2012/0143612 A1 | 6/2012 | Yu et al. |
| 2012/0214416 A1 | 8/2012 | Kent et al. |
| 2012/0253814 A1 | 10/2012 | Wang et al. |
| 2013/0144595 A1 | 6/2013 | Lord et al. |
| 2013/0204623 A1 | 8/2013 | Suzuki et al. |
| 2014/0142958 A1 | 5/2014 | Sharma et al. |
| 2014/0188478 A1 | 7/2014 | Zhang |
| 2014/0318348 A1 | 10/2014 | Tsunoo et al. |
| 2015/0036464 A1 | 2/2015 | Moriguchi |
| 2015/0347399 A1 | 12/2015 | Aue et al. |
| 2017/0206195 A1 | 7/2017 | Moriguchi et al. |
| 2017/0212720 A1 | 7/2017 | Moriguchi et al. |

FOREIGN PATENT DOCUMENTS

| | | | |
|---|---|---|---|
| GB | 2460306 A | 12/2009 |
| JP | S61-116400 U1 | 7/1986 |
| JP | H02190888 A | 7/1990 |
| JP | H08-008855 A | 1/1996 |
| JP | H08079199 A | 3/1996 |
| JP | H109018394 A | 1/1997 |
| JP | H10174190 A | 6/1998 |
| JP | H1115827 A | 1/1999 |
| JP | H11252121 A | 9/1999 |
| JP | H11331462 A | 11/1999 |
| JP | 2000207170 A | 7/2000 |
| JP | 2002092236 A | 3/2002 |
| JP | 2002217839 A | 8/2002 |
| JP | 2002259612 A | 9/2002 |
| JP | 2003506918 A | 2/2003 |
| JP | 2003536094 A | 12/2003 |
| JP | 2006092740 A | 4/2006 |
| JP | 3822224 B1 | 9/2006 |
| JP | 2006251676 A | 9/2006 |
| JP | 2007121626 A | 5/2007 |
| JP | 2007164659 A | 6/2007 |
| JP | 2008058953 A | 3/2008 |
| JP | 2008192109 A | 8/2008 |
| JP | 2008299032 A | 12/2008 |
| JP | 2009180893 A | 8/2009 |
| JP | 2009205485 A | 9/2009 |
| JP | 2010011282 A | 1/2010 |
| JP | 2010072641 A | 4/2010 |
| JP | 2010284423 A | 12/2010 |
| JP | 2011109629 A | 6/2011 |
| JP | 2011255982 A | 12/2011 |
| JP | 2013005377 A | 1/2013 |
| JP | 2013008109 A | 1/2013 |
| JP | 2013117688 A | 6/2013 |
| JP | 2013125047 A | 6/2013 |
| JP | 2013178510 A | 9/2013 |
| KR | 101288305 B1 | 8/2013 |
| WO | 0076154 A1 | 12/2000 |
| WO | 0182554 A2 | 11/2001 |
| WO | 2010016589 A1 | 2/2010 |
| WO | 2012116213 A1 | 8/2012 |
| WO | 2014129370 A1 | 8/2014 |

OTHER PUBLICATIONS

International Search Report issued in International Patent Application No. PCT/JP2015/073400 dated Oct. 6, 2015.
Written Opinion issued in International Patent Application No. PCT/JP2015/073400 dated Oct. 6, 2015.
Office Action issued in U.S. Appl. No. 15/830,367 dated Mar. 22, 2018.
Office Action issued in Korean Application No. 10-2017-7031874 dated Jul. 6, 2018. English translation provided.
Office Action issued in Korean Application No. 10-2017-7031865 dated Jul. 6, 2018. English translation provided.
Office Action issued in U.S. Appl. No. 15/830,367 dated Oct. 19, 2018.
International Search Report issued in Intl. Appln. No. PCT/JP2015/071237 dated Aug. 18, 2015 English translation provided. Cited in U.S. Publication Nos. 4 and 5.
International Search Report issued in Intl. Appln. No. PCT/JP2015/071236 dated Aug. 25, 2015 English translation provided. Cited in U.S. Publication Nos. 4 and 5.
Written Opinion issued in Intl. Appln. No. PCT/JP2015/071236 dated Aug. 25, 2015. Cited in U.S. Publication Nos. 4 and 5.
Written Opinion issued in Intl. Appln. No. PCT/JP2015/071237 dated Aug. 18, 2015. Cited in U.S. Publication Nos. 4 and 5.
Extended European Search Report issued in European Appln. No. 15828167.5 dated Nov. 10, 2017. Cited in U.S. Publication Nos. 4 and 5.
Office Action issued in Japanese Appln. No. 2017-103875 dated Dec. 12, 2017. English machine translation provided. Cited in U.S. Publication Nos. 4 and 5.
Office Action issued in Japanese Appln. No. 2017-103876 dated Jun. 6, 2017. English machine translation provided. Cited in U.S. Publication Nos. 4 and 5.
Extended European Search Report issued in European Appln. No. 15827950.5 dated Feb. 26, 2018. Cited in U.S. Publication No. 4 and 5.
Office Action issued in Australian Appln. No. 2015297647 dated Mar. 14, 2017. Cited in U.S. Publication No. 4 and 5.
Office Action issued in Australian Appln. No. 2015297648 dated Mar. 14, 2017. Cited in U.S. Publication No. 4 and 5.
Office Action issued in Korean Appln. No. 10-2017-7005253 dated May 11, 2017. English translation provided. Cited in U.S. Publication Nos. 4 and 5.
Office Action issued in Korean Appln. No. 10-2017-7005255 dated May 11, 2017. English translation provided. Cited in U.S. Publication Nos. 4 and 5.
Office Action issued in U.S. Appl. No. 15/327,735 dated Feb. 23, 2018. Cited in U.S. Publication No. 5.
Office Action issued in U.S. Appl. No. 15/327,753 dated Feb. 23, 2018. Cited in U.S. Publication No. 4.
Extended European Search Report issued in European Application No. 15835023.1 dated Apr. 5, 2018.
Extended European Search Report issued in European Application No. 17205390.2 dated Mar. 26, 2018.
Office Action issued in Japanese Appln. No. 2014-171320 dated Jul. 31, 2018. English machine translation provided.

(56) References Cited

OTHER PUBLICATIONS

Office Action issued in U.S. Appl. No. 15/327,735 dated Aug. 16, 2018.
Office Action issued in U.S. Appl. No. 15/327,753 dated Aug. 10, 2018.
Office Action issued in Japanese Appln. No. 2017-187576 dated Aug. 21, 2018. English Translation provided.
Office Action issued in Korean Appln No. 10-2017-7031874 dated Oct. 19, 2018. English Translation provided.
Choi et al., "Mobile-Based RFID System for Efficient Service of Cultural Assets Information in Ubiquitous Environment," Journal of the Korean Society for Computer Game, No. 8. Jun. 2006: 1-20. English Translation provided. Cited in NPL 1.
Statement of Opposition against Japanese Patent No. 6231244 filed on May 15, 2018. English Translation provided.
"Report of development and study of information distribution system using acoustic watermark technology." New Media Development Association. Mar. 19, 2010: 1-132. Partial English Translation Provided. Cited in NPL 3 and 6.
"Development of information compensation system for the disabled using electronic watermark technology—for barrier-free acoustic information." National Institute of Special Needs Education. Mar. 2007: 1-103. Partial English Translation Provided. Cited in NPL 3 and 6.
Notice of Reasons for Revocation for Japanese Patent No. 6231244 dated Oct. 19, 2018. English Translation provided.
Office Action issued in European Patent Application No. 15828167.5 dated Nov. 30, 2018.
Office Action issued in U.S. Appl. No. 15/327,753 dated Feb. 7, 2019.
Office Action issued in U.S. Appl. No. 15/327,735 dated Feb. 8, 2019.
Office Action issued in European Appln. No. 15827950.5 dated Feb. 7, 2019.
Office Action issued in Korean Appln No. 10-2017-7031874 dated Jan. 4, 2019. English Translation provided.
Office Action issued in Korean Appln. No. 10-2017-7031865 dated Sep. 10, 2018. Translation provided.
Advisory Action issued in U.S. Appl. No. 15/327,753 dated Nov. 9, 2018.
Office Action issued in U.S. Appl. No. 15/830,367 dated May 10, 2019.
Office Action issued in Japanese Application No. 2016-074650 dated Mar. 19, 2019. English translation provided.
Office Action issued in Japanese Application No. 2016-074651 dated Mar. 26, 2019. English translation provided.
Summons to Attend Oral Proceedings issued in European Application No. 158281675 dated Apr. 8, 2019.
Determination of an Opposition issued in Japanese Patent No. 6231244 dated Apr. 12, 2019. English translation provided.
Advisory Action issued in U.S. Appl. No. 15/327,735 dated Nov. 9, 2018.
Office Action issued in Chinese Application No. 201580040546.2 dated Mar. 14, 2019. English translation provided.
Press materials of The Ministry of Internal Affairs and Communications, "Study meeting on the way of instantaneous information transmission by sirens, etc. Report, field test results and standard specifications, Mar. 27, 2006, Fire Department." Concise explanation of relevance provided in the attached English translation of pp. 38-41 of the Determination of an Opposition issued in Japanese Patent No. 6231244, which was previously cited in an IDS on May 21, 2019.

* cited by examiner

AUDIO PROCESSING DEVICE AND METHOD OF PROVIDING INFORMATION

TECHNICAL FIELD

The present invention relates to a technique for processing audio signals.

BACKGROUND ART

Services that provide users with guidance information on public transportation services in the form of automated sounds are in wide use. For example, announcement systems used in buses provide passengers with guidance information by way of voice guidance on, for example, bus stops, bus fares, and the like, which guidance voice is played at an appropriate timing, for example at each of bus stops, upon operation of an operator, with such voice guidance being pre-prepared for each of bus routes. Patent Document 1 discloses a configuration in which information such as names of bus stops is announced to passengers through the generation of voice signals that correspond to voice data based on operations such as an input operation into a device installed in a bus carriage. Patent Document 2 discloses a configuration for the creation of voice data corresponding to a guidance voice whereby, supposing that a content of voice guidance is a sentence such as "the next stop is [name of a bus stop]", names of bus stops are created by utilizing low-compression coding, while common words such as "next", "is", and the like are created by utilizing high-compression coding.

RELATED ART DOCUMENT(S)

Patent Document(S)

Patent Document 1: Japanese Utility Model Registration Application Laid-Open Publication No. S61-116400
Patent Document 2: Japanese Patent Application Laid-Open Publication No. H08-008855

SUMMARY OF THE INVENTION

Problem to be Solved by the Invention

A technique by which information is distributed to terminal devices using transmission of sound waves (hereinafter, "audio communication") is practiced in the art. In audio communication, information is distributed to and received by terminal devices upon emission of a sound that represents an audio signal in which information for distribution is contained within a high and inaudible frequency range, for example, from 18 kHz to 20 kHz. In this example, application of audio communication to the voice guidance systems exemplified in Patent Documents 1 and 2 is assumed. It is common for external environment noise, such as engine noise, and vibration noise to intrude into the interior of a bus. To enable passengers to clearly comprehend voice guidance, audio components in a lower frequency audible range of the audio signal, for example, of equal to or less than approximately 16 kHz, may be filtered in, while those in the higher range may be omitted. For this reason, upon application of audio communication as disclosed in Patent Documents 1 and 2, distribution information contained in a high frequency band is prevented from being output (emitted). While the explanation above relates to buses used for public transportation, the same problem is liable to occur in any environment in which a variety of information is provided to users, such as other public transportation services, or within public facilities, and others. In view of the above-described matters, an object of the present invention is to provide appropriate audio communication in an environment in which certain frequency bands are suppressed.

Means of Solving the Problems

To solve the abovementioned problems, an audio processing device according to a first aspect of the present invention includes: information extraction means that extracts identification information from a first audio signal in a first frequency band in which audio signal there are included an audio component of a sound for reproduction and an audio component including the piece of identification information of the sound for reproduction; and second audio signal generation means that generates a second audio signal that includes the identification information extracted by the information extraction means, and is in a second frequency band, which frequency band is higher than the first frequency band, and wherein a sound represented by the second audio signal is emitted by sound emission means. According to the above configuration, an audio component of the sound for reproduction, for example, guidance voice for provision to a user, and an audio component including the identification information of the sound for reproduction are each included in the first audio signal in the first frequency band, while the identification information extracted from the first audio signal is included in the second audio signal in the second frequency band. According to the above embodiment, it is possible to collectively and appropriately transmit (broadcast) identification information to proximate devices via audio communication by utilizing the second frequency band, even in an environment in which the second frequency band is suppressed in the first audio signal. The second frequency band is, for example, in a high range of between 16 kHz and 20 kHz, and more preferably, within a range of between 18 kHz and 20 kHz. Examples of a "sound for reproduction" include sound of guidance information for provision to users of a public facility or a public transportation service, as in, for example, respectively, facility information on opening and closing hours, or information on transfer locations, fares, and so forth.

In a preferred embodiment of the present invention, the audio processing device includes: sound receiving means that receives a sound represented by a reproduction signal in which there are included the audio component of the sound for reproduction and the audio component that includes the identification information of the sound for reproduction, for generation of the first audio signal; and sound emission means that emits a sound represented by the second audio signal generated by the second audio signal generation means. According to this embodiment, it is possible to appropriately transmit the identification information via audio communication without need to change an existing system that emits a sound indicated by the reproduction signal in which the second frequency band is suppressed. Emission of the sound represented by the second audio signal includes emitting a sound represented by a signal obtained by synthesizing with the second audio signal another different signal, for example, an audio component of the reproduction signal.

In another preferred embodiment of the present invention, a length of time over which the sound represented by the second audio signal is emitted by the sound emission means is longer than a length of time over which the audio component including the identification information of the sound for reproduction within the reproduction signal is emitted. In this way, it is possible to ensure that sufficient opportunity exists for the terminal device at the receiving side to receive the identification information contained in the second audio signal. The first frequency band, for example, is set to be within an audible range, while the second frequency band is set to be within a range higher than the first frequency band, namely, a frequency band that is barely audible to a user. However, in this case, the user may perceive incongruity or discomfort if the audio component in which the identification information is contained is emitted for a protracted length of time. According to the above embodiment, however, a length of time over which the sound represented by the second audio signal in the second frequency band is emitted is set to be longer than a length of time over which the audio component including the identification information within the reproduction signal of the first frequency band is emitted. In short, the identification information emitted via audio communication in which the sound in the second frequency band is utilized and which is barely audible to the user is transmitted for comparatively longer period of time. In this way, it is possible to reduce a likelihood of the user perceiving incongruity or discomfort that may otherwise result from the audio component in the first frequency band that includes the identification information of the sound for reproduction being transmitted for a protracted period of time. It is also possible to notify each terminal device of the identification information without causing the user to perceive incongruity or discomfort, and to allow each terminal device to re-acquire the identification information in the event that initial receipt of the identification information is not successful.

Preferably, a period in which the sound represented by the second audio signal is emitted by the sound emission means and a period in which the audio component of the sound for reproduction within the reproduction signal is emitted may overlap. According to this embodiment, since the audio component including the identification information is emitted in parallel to the emission of the corresponding sound for reproduction, it is possible for the terminal device of the user to acquire, closer to real-time, information corresponding to the notified identification information, as compared, for example, to a configuration in which the identification information is notified after playback of the sound for reproduction is complete.

In yet another preferred embodiment of the present invention, a reproduction signal is supplied, as the first audio signal, from a reproduction processing device to the information extraction means via a signal line, the reproduction processing device generating the reproduction signal that includes the audio component of the sound for reproduction and the audio component that includes the identification information of the sound for reproduction. According to this embodiment, since the audio processing device generates the second audio signal that includes the identification information extracted from the first audio signal in which the second frequency band is suppressed, it is possible to appropriately transmit the identification information without any need to change the existing system. Furthermore, because the reproduction signal is supplied as an audio signal to the information extraction means via the signal line, it is not necessary to install a sound receiving device in the audio processing device. Accordingly, an advantage is realized in that configuration of devices can be simplified, in contrast to a set-up in which a sound receiving device is provided.

The audio processing device according to a second aspect of the present invention includes: information extraction means that extracts identification information from a first audio signal that includes an audio component of a sound for reproduction and an audio component that includes the identification information of the sound for reproduction; transmission signal generation means that generates a transmission signal that includes the identification information extracted by the information extraction means; and transmission means that transmits an electromagnetic wave indicative of the transmission signal generated by the transmission signal generation means. Examples of communication using electromagnetic waves include Wi-Fi (registered trademark), Bluetooth (registered trademark), and infrared communication. According to the above embodiment, it is possible to distribute information by use of a variety of different transmission media, and thus it is possible to appropriately transmit the identification information even in an environment in which a particular frequency band is suppressed.

The audio processing device according to the second aspect may include sound receiving means that receives a sound represented by a reproduction signal that includes the audio component of the sound for reproduction and the audio component that includes the identification information of the sound for reproduction, for generation of the first audio signal. Alternatively, the reproduction signal may be supplied as the first audio signal from a reproduction processing device that generates the reproduction signal to the information extraction means via a signal line. According to the abovementioned embodiments, since the audio processing device generates a transmission signal that includes the identification information extracted from the first audio signal in which the second frequency band is suppressed, it is possible to appropriately transmit the identification information by way of electromagnetic waves without any need to change the existing system. Furthermore, in the configuration in which the first audio signal is supplied to the information extraction method via a signal line, it is not necessary to install a sound receiving device in the audio processing device, and thus it is possible to simplify the configuration of the devices as compared to a set-up in which a sound receiving device is installed.

With respect to the audio processing device according to the first or second aspect, the sound receiving means preferably is provided close to the sound emission device that emits the sound represented by the reproduction signal. According to this configuration, since the sound receiving device is provided close to the sound emission device that emits the sound represented by the reproduction signal, interference caused by noise can be avoided.

The present invention may also be characterized as a program that causes a computer to execute the different functional elements that the audio processing device according to each of the abovementioned embodiments includes, and a computer-readable recording medium in which the program is installed. In other words, a first aspect of the program of the present invention causes a computer to execute information extraction processing for extracting identification information from a first audio signal in a first frequency band in which audio signal there are included an audio component of a sound for reproduction and an audio component that includes the identification information of the sound for reproduction; and a second audio signal generation processing for generating a second audio signal that includes the identification information extracted in the information extraction processing, and is in a second frequency band, which frequency band is higher than the first frequency band, wherein a sound represented by the second audio signal is emitted by sound emission means. A second aspect of the program of the present invention causes a computer to execute information extraction processing for extracting identification information from a first audio signal that includes an audio component of a sound for reproduction and an audio component that includes the identification information of the sound for reproduction; transmission signal generation processing for generating a transmission signal that includes the identification information extracted in the information extraction processing; and transmission processing for transmitting an electromagnetic wave indicative of the transmission signal generated in the transmission signal generation processing.

Furthermore, the present invention may also be identified as an information providing method in which there is utilized the audio processing device according to each of the abovementioned embodiments. In other words, an information providing method according to the first aspect of the present invention extracts identification information from a first audio signal in a first frequency band in which audio signal there are included an audio component of a sound for reproduction and an audio component that includes the identification information of the sound for reproduction; generates a second audio signal that is a signal including the identification information and that is in a second frequency band, which frequency band is higher than the first frequency band; and emits a sound represented by the second audio signal. The information providing method according to the second aspect of the present invention extracts identification information from a first audio signal that includes the audio component of a sound for reproduction and the audio component that includes the identification information of the sound for reproduction; generates a transmission signal that includes the identification information; and transmits an electromagnetic wave indicative of the transmission signal.

The information providing method, the program, and the computer-readable recording medium with the program installed therein, each of which may be realized according to one or other of the above preferred embodiments, realizes substantially the same effects as those realized by an information management system according to the abovementioned embodiments.

The information providing method according to the first aspect of the present invention emits the audio component of the sound for reproduction after the emission of the audio component that includes the identification information of the sound for reproduction, and a period in which the sound represented by the second audio signal is emitted and a period in which the audio component of the sound for reproduction overlap. According to this embodiment, it is possible to transmit the identification information by audio communication, for example, in parallel to the playback of the sound for reproduction, since the audio component of the sound for reproduction is emitted after the emission of the audio component that includes the identification information of the sound for reproduction is complete.

MODES FOR CARRYING OUT THE INVENTION

First Embodiment

Description will now be given of an overview of a voice guidance system 1 of the first embodiment. In the following, an example configuration is described in which the voice guidance system 1 of the first embodiment is used for onboard audio announcements for a public transportation service. The voice guidance system 1 provides passengers of a public bus with voice guidance by way of guidance voice (sound for reproduction) that represent guidance information, for example, guidance on bus stops, fares, or on tourist sites, or a surrounding area, and so forth.

Figure 1:
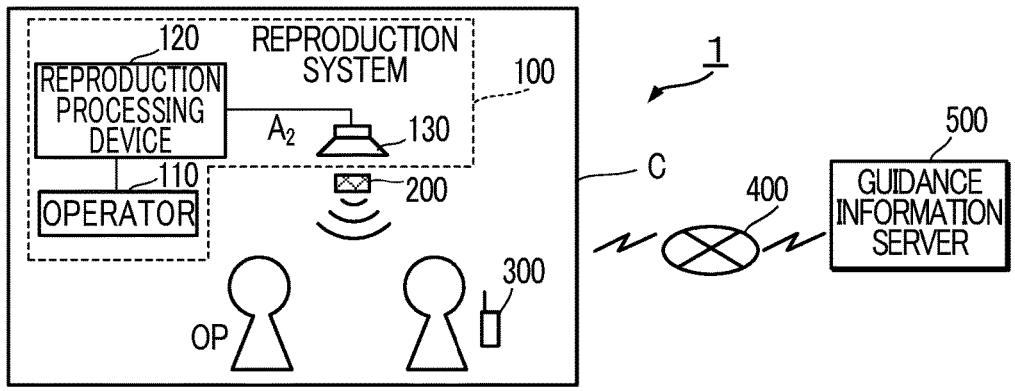
FIG. 1 is a diagram illustrating a configuration of a voice guidance system 1 of a first embodiment.

FIG. 1 is a diagram showing a configuration of the voice guidance system 1 of the first embodiment. The voice guidance system 1 includes a reproduction system 100, an audio processing device 200, and a terminal device 300. The reproduction system 100 and the audio processing device 200 are installed inside a carriage C of a public bus service.

The reproduction system 100 emits inside the carriage C, along with a guidance voice, a sound in a frequency band $B_1$ that includes identification information that corresponds to one of a multiplicity of guidance voices, each of which are different. A passenger of the carriage C (hereinafter, the user) hears the guidance voice. In the meantime, the audio processing device 200 extracts the identification information from the sound that the reproduction system 100 emits, so as to emit a sound in a frequency band $B_2$ that includes the identification information. The frequency band $B_1$ and the frequency $B_2$ are different from each other. In other words, the audio processing device 200 is a signal processing device that converts a frequency band of an audio that includes identification information to another frequency band that includes the same identification information.

The terminal device 300 is a portable communication terminal that a user in the carriage C carries with him/her (e.g., a mobile phone/smartphone), and the terminal device 300 extracts identification information of a guidance voice from a sound emitted by the audio processing device 200 and receives, via a communication network 400, for example, a mobile communication network or the Internet, from a guidance information server 500 guidance information that corresponds to the identification information. Guidance information relates to guidance provided by guidance voice. For example, any of the following may be provided to the terminal device 300 as guidance information, for reproduction, to be emitted, or displayed: characters and/or still or moving images indicative of information on user guides, such as facilities, fares, and so forth; travel guide, such as stops, transfer locations, and so forth; and tourist information for local areas close to the guided location, such as tourist facilities, accommodation, area guides such as for historic sites, and so forth; characters that represent guidance voice, for example, characters to which a hearing-impaired person may refer so as to visually check guidance information; and/or sounds and/or characters obtained by translating the guidance information provided through the guidance voice into a foreign language. Details of the different elements of the voice guidance system 1 will now be described below.

Reproduction System 100

As shown in FIG. 1, the reproduction system 100 includes an operator 110, a reproduction processing device 120, and a sound emission device 130. The operator 110 is an input device that receives instructions from the driver $O_P$ of a public transportation bus. Each time the carriage C approaches a given stop, the driver $O_P$ initiates playback of a guidance voice relating to the stop by operating the operator 110. The reproduction processing device 120 generates an audio signal (hereinafter, the "reproduction signal") $A_2$ that represents a sound obtained by synthesizing the guidance voice that the driver $O_P$ has initiated the playback of by operating the operator 110, from among multiple different guidance voices, and a sound that includes identification information of the guidance voice. The sound emission device 130 (e.g., speakers) emits a sound that represents the reproduction signal $A_2$ generated by the reproduction processing device 120. In FIG. 1, a single sound emission device 130 is shown, but in reality, multiple sound emission devices 130 are installed in the carriage C, and the reproduction signals $A_2$ are supplied in parallel thereto from the reproduction processing device 120.

Figure 2:
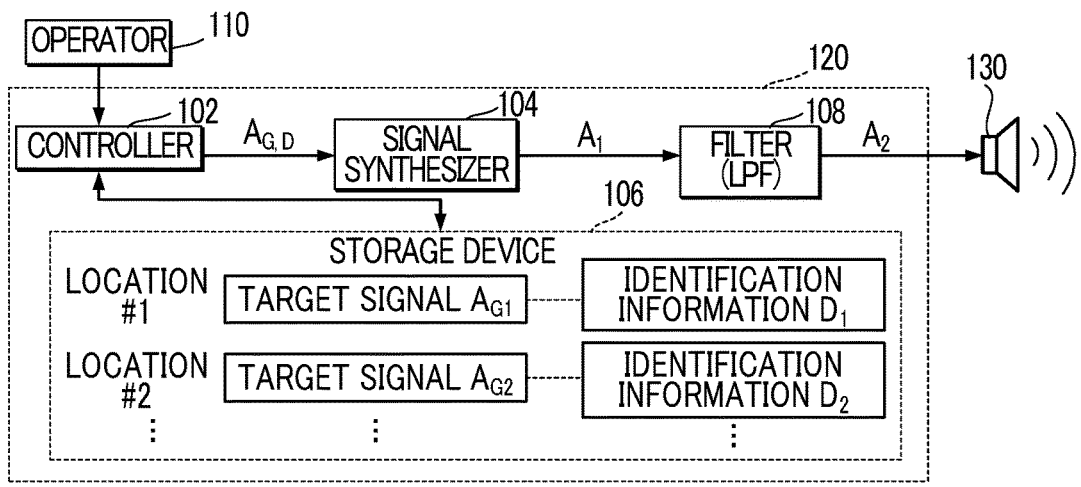
FIG. 2 is a block diagram showing a reproduction system 100 of the first embodiment.

FIG. 2 is a block diagram showing a configuration of the reproduction system 100. The reproduction processing device 120 of the first embodiment includes a controller 102, a signal synthesizer 104, a storage device 106, and a filter 108, as FIG. 2 shows. The storage device 106 consists of a publically known recording medium, such as, for example, a semiconductor recording medium or a magnetic recording medium, and stores, for every location (stop) at which the carriage C stops, an audio signal (hereinafter referred to as a "target signal") $A_G$ ($A_{G1}$, $A_{G2}$, . . . ) that indicates a guidance voice related to one such location, as well as identification information D ($D_1$, $D_2$, . . . ) of guidance information that relates to the location. The target signal $A_G$ and the identification information D are not necessarily stored in the storage device 106 of the reproduction processing device 120. For example, the reproduction processing device 120 may instead receive the target signal $A_G$ and the identification information D from an external device (a server device) by communicating with the external device.

Stops include not only stops that exist along the route of a public bus but also places that serve as transfer locations (for example, public transportation stations, airports, or any given location on a public roadway). The identification information D is a unique code that is used to identify the guidance information, and it is set for each location at which the bus carriage C stops (bus stop). For example, a sequence of random numbers generated by a publically known method is set as the identification information D for all guidance information so that identification information D does not overlap.

The controller 102 of FIG. 2, in accordance with the playback instruction that the operator 110 has accepted from the driver $O_P$ as the carriage C approaches a stop, reads from the storage device 106 the target signal $A_G$ and the identification information D that correspond to the stop and supplies the signal synthesizer 104 with the target signal $A_G$ and the identification information D. The signal synthesizer 104 generates a reproduction signal A1 by synthesizing the identification information D with the target signal $A_G$. Any publically known method may be used for synthesizing the identification information D with the target signal $A_G$, but one preferable method is that disclosed in WO 2010/016589.

Figure 3:
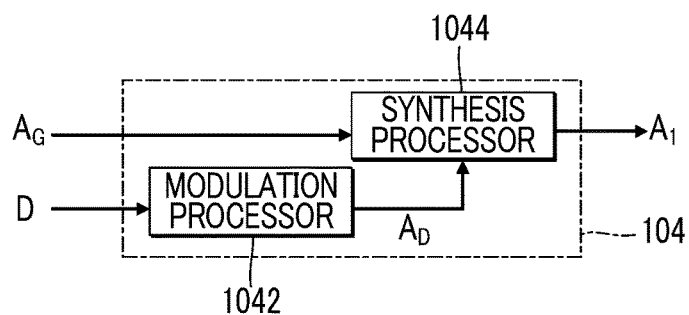
FIG. 3 is a block diagram showing a signal synthesizer 104 of the first embodiment.

FIG. 3 is a block diagram showing a configuration of the signal synthesizer 104. As shown in FIG. 3, the signal synthesizer 104 includes a modulation processor 1042 and a synthesis processor 1044. The modulation processor 1042 generates an audio signal (hereinafter, the "modulation signal") $A_D$ that includes identification information D as an audio component in a particular frequency band by sequentially carrying out spread modulation of the identification information D using a spread code, and frequency conversion using a carrier wave in a predetermined frequency. The modulation processor 1042 synthesizes a notification sound with the modulation signal $A_D$. The notification sound included in the modulation signal $A_D$ is a natural sound that attracts the attention of passengers in the carriage C (e.g., a sound for guidance, such as "dingdong"). The frequency band of the modulation signal $A_D$ is one in which the emission of a sound by the sound emission device 130 and the reception of a sound by the audio processing device 200 are possible, and the frequency band is included within the frequency band range of sounds of voices or music that a user is exposed to in an ordinary environment, for example, equal to or less than approximately 16 kHz, which is within an audible range. The synthesis processor 1044 generates a reproduction signal $A_1$ by synthesizing (typically by adding) the target signal $A_G$ supplied from the controller 102 and the modulation signal $A_D$ generated by the modulation processor 1042. The method by which the modulation processor 1042 generates the modulation signal $A_D$ is not limited to the above example (spread modulation). For example, as an alternative, it is possible to generate the modulation signal $A_D$ within a particular frequency band by frequency-modulating a carrier wave, such as a sine wave in a predetermined frequency, based on the identification information D.

Figure 4:
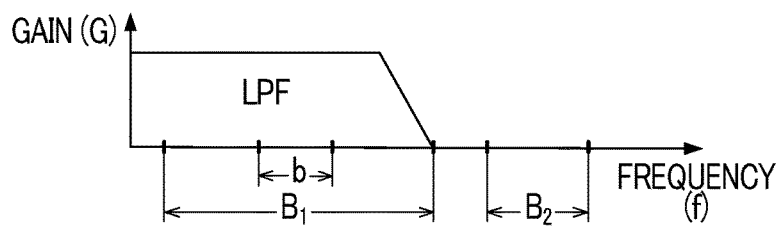
FIG. 4 is a characteristic diagram illustrative of a filter 108 of the first embodiment.

The filter 108 of FIG. 2 is a low-path filter (LPF) that generates a reproduction signal $A_2$ by suppressing the frequency components in the higher end of the reproduction signal $A_1$. FIG. 4 is a characteristic diagram of the filter 108 of the first embodiment. In order for the guidance voice to be clearly perceived by passengers in the carriage C, which is subject to intrusion of exterior noise such as engine and vibration noise, the filter 108, as shown in FIG. 4, suppresses the components in the higher-end frequency band, for example, between 18 kHz and 20 kHz, of the reproduction signal $A_1$ while maintaining the components in the lowerend frequency band $B_1$, for example, equal to or less than approximately 16 kHz, which is within an audible range, and which corresponds to the guidance voice. The frequency band $B_1$ is a frequency band in which the emission of a sound by the sound emission device 130 and the reception of a sound by the audio processing device 200 are possible, and this frequency band is included in the frequency band range of sounds of voices or music that the user is exposed to in an ordinary environment (for example, equal to or less than approximately 16 kHz, which is within an audible range). A frequency band b of a modulation signal $A_D$ including the identification information D is included in a pass band (frequency band $B_1$) of the filter 108. As will be understood from the above explanation, the frequency band $B_1$ of the target signal $A_G$ and the modulation signal $A_D$ are set to a band that passes the filter 108. The frequency band $B_1$ is not limited to the above example, and may be a low band equal to or less than 4 kHz or 6 kHz.

Figure 5:
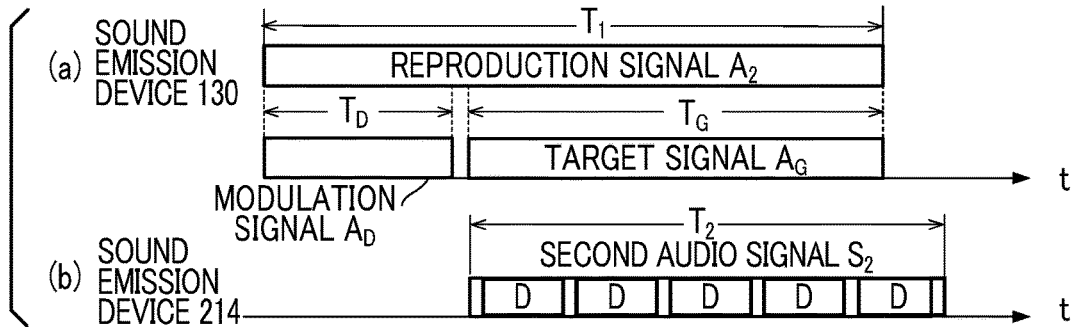
FIG. 5 is a diagram illustrative of a time length of a modulation signal $A_D$, a target signal $A_G$ and a second audio signal $S_2$.

A section (a) in FIG. 5 is a diagram illustrative of the relationship between the length of time over which a sound of the reproduction signal $A_2$ is emitted and the length of time of a sound indicated by the modulation signal $A_D$ (hereinafter "notification sound") and a sound of the target signal $A_G$ (guidance voice) that are contained in the reproduction signal $A_2$. The sound of the reproduction signal $A_2$ is emitted over a time length Tl. As the section (a) shows, the modulation signal $A_D$ that includes identification information D extends over a time length $T_D$ from the start of the reproduction signal $A_2$, and is contained in the time length Tl over which the sound of the reproduction signal $A_2$ is emitted. The guidance voice that the target signal $A_G$ indicates is emitted over a time length $T_G$ starting immediately after the emission of the modulation signal $A_D$ ends. In other words, among the reproduction signal $A_2$, the duration of emission of the sound indicated by the modulation signal $A_D$ (time length $T_D$) and the duration of emission of the sound indicated by the target signal $A_G$ (time length $T_G$) do not overlap. The time length $T_D$ over which the modulation signal $A_D$ is played is set to a sufficiently shorter time, for example, one to two seconds, compared to the time length $T_G$ of the guidance voice.

Figure 6:
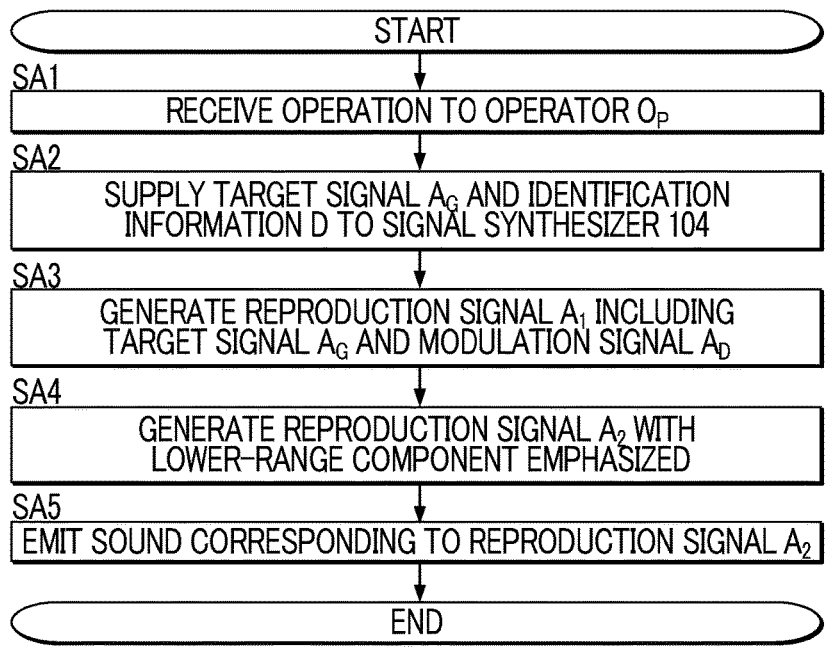
FIG. 6 is a flowchart showing a flow of an operation carried out in the reproduction system 100.

FIG. 6 is a flowchart showing a flow of the overall operation of the reproduction processing device 120 of the present embodiment. For example, when a playback instruction initiated by the driver $O_P$ via the operator 110 is accepted as the carriage C approaches a stop (SA1), the controller 102 reads from the storage device 106 the target signal $A_G$ of a guidance voice corresponding to the location in turn corresponding to the playback instruction, as well as the identification information D, and supplies the target signal $A_G$ and the identification information D to the signal synthesizer 104 (SA2). The signal synthesizer 104 generates the reproduction signal $A_1$ by synthesizing the target signal $A_G$ of the guidance voice, which is an audio component of the guidance voice, supplied from the controller 102, and the modulation signal $A_D$ that includes the identification information D, which is an audio component that includes the identification information D of the guidance voice, supplied from the controller 102 (SA3). The filter 108 generates the reproduction signal $A_2$ by extracting the frequency band $B_1$ from the reproduction signal $A_1$ generated by the signal synthesizer 104 (SA4). The sound emission device 130 emits a sound indicated by the reproduction signal $A_2$ that has undergone processing carried out by the filter 108 (SA5).

Audio Processing Device 200

Figure 7:
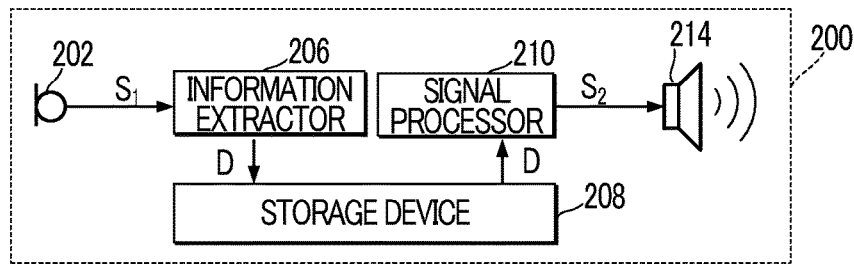
FIG. 7 is a block diagram showing an audio processing device 200 of the first embodiment.

FIG. 7 is a block diagram showing a configuration of the audio processing device 200. The audio processing device 200 of the first embodiment is an audio device that is installed close to the sound emission device 130 of the reproduction system 100, for example, on a surface of a speaker net, and furthermore as shown in FIG. 7, the audio processing device 200 includes a sound receiving device 202, an information extractor 206, a storage device 208, a signal processor 210, and a sound emission device 214. The sound receiving device 202 generates a first audio signal $S_1$ by receiving a sound of the reproduction signal $A_2$ emitted from the sound emission device 130 of the reproduction system 100. The first audio signal $S_1$ contains, in the frequency band $B_1$, an audio component of the modulation signal $A_D$ that includes identification information D (notification sound) and an audio component of the guidance voice. In the first embodiment, the reproduction signal $A_2$ is less likely to be influenced by noise since the audio processing device 200 is provided close to the sound emission device 130. In other words, the audio processing device 200 is provided at a position that minimizes noise when the sound receiving device 202 receives a sound of the reproduction signal $A_2$.

The information extractor 206 and the signal processor 210 of FIG. 7 are realized by a computer processing unit (Central Processing Unit: CPU) carrying out a program stored in the storage device 208. The information extractor 206 extracts the identification information D by demodulating the first audio signal $S_1$ generated by the sound receiving device 202. More specifically, the information extractor 206 extracts the identification information D by selecting, by way of, for example, a band pass filter, a band component of a frequency band b that includes the identification information D within the first audio signal $S_1$ and allowing the selected band component to pass a matched filter that has, as a coefficient, a spread code used in the spread modulation of the identification information D. In the first embodiment, since the audio processing device 200 is provided close to the sound emission device 130, it is possible to extract the identification information D with high accuracy even when the time length $T_D$ of the notification sound is set to a substantially shorter time compared to the time length $T_G$ of the guidance voice. The identification information D extracted by the information extractor 206 is stored in the storage device (memory) 208. As will be understood from the above explanation, the identification information D is notified by the reproduction system 100 to the audio processing device 200 in the form of audio communication that uses, as a transmission medium, a sound, namely a sound wave propagated through air in the form of vibrations. The information extractor 206 and all or part of the function of the signal processor may also be realized by use of specific electric circuitry.

The signal processor (second audio signal generator) 210 generates a second audio signal (modulation signal) $S_2$, which includes the identification information D as an audio component of the higher-end frequency band $B_2$, by reading from the storage device 208 the identification information D extracted by the information extractor 206, and sequentially carrying out spread modulation of the identification information D using the spread code and frequency conversion using a carrier wave in a particular frequency. The sound emission device 214 emits a sound indicated by the second audio signal $S_2$ generated by the signal processor 210. In FIG. 7, for convenience of explanation, an A/D converter that converts the reproduction signal $A_2$ from analog to digital format and a D/A converter that converts the second audio signal $S_2$ from digital to analog format are not shown.

As shown in FIG. 4, the frequency band $B_2$ of the second audio signal $S_2$ differs from the frequency band $B_1$ of the first audio signal $S_1$. In other words, the frequency band $B_2$ of the second audio signal $S_2$ is higher than the frequency band $B_1$ of the first audio signal $S_1$. More specifically, the frequency band $B_2$ is a frequency in which emission of a sound by the sound emission device 214 and reception of a sound by the terminal device 300 are possible, and this frequency band is included within a frequency band of, for example, between 18 kHz and 20 kHz, which is higher than a frequency band of vocal or musical sounds to which a user is exposed in an ordinary environment, such as a frequency band that is equal to or less than approximately 16 kHz, which is in an audible range. Consequently, the reproduced sound of the second audio signal $S_2$ that includes the identification information D is barely perceivable to the user of the terminal device 300. In other words, it is possible to transmit the identification information D to the terminal device 300 by audio communication without disruption to the user's hearing of the guidance voice. As will be understood from the above explanation, since, in the first embodiment, there is generated the second audio signal $S_2$ that includes the identification information D as an audio component of the frequency band $B_2$, and which differs from the frequency band $B_1$ of the reproduction signal $A_2$, even in a case that the reproduction system 100 (filter 108) is configured to suppress the frequency band $B_2$ so as to emphasize the frequency band $B_1$ of the guidance voice, it is still possible to notify different terminal devices 300 of the identification information D by audio communication by using the frequency band $B_2$. In other words, it is possible for the audio processing device 200 to appropriately transmit the identification information D via audio communication without any need to change the reproduction system 100, which is a conventional system that emits a sound indicated by the reproduction signal $A_2$ in which the frequency band $B_2$ is suppressed.

Section (b) of FIG. 5 is a diagram illustrative of the second audio signal $S_2$. As exemplified in section (b), the signal processor 210 of the first embodiment generates the second audio signal $S_2$ to which the identification information D is added in a repetitive manner in differing sections along the time axis. The sound that the second audio signal $S_2$ represents is emitted continuously over a time length $T_2$ from the time the information extractor 206 extracts the identification information D from the sound emitted from the sound emission device 130. In other words, the identification information D is notified to each terminal device 300 via audio communication in a repetitive manner over the time length $T_2$.

As will be understood from the comparison between section (a) and section (b) of FIG. 5, the time length $T_2$ over which the sound emission device 214 of the audio processing device 200 emits a sound indicated by the second audio signal $S_2$ is longer than the time length $T_D$ over which the sound emission device 130 of the reproduction system 100 emits the notification sound of the modulated signal $A_D$. If the notification sound within the audible range that includes the identification information D is emitted over a protracted period of time, there is a possibility that the user will perceive incongruity or discomfort. In the first embodiment, however, since the length of time over which the notification sound of the frequency band $B_1$ is emitted is limited to the time length $T_D$, it is possible to minimize any possibility that the user will perceive incongruity or discomfort as a result of the notification sound being emitted over a protracted period of time. In contrast, since the signal processor 210 of the audio processing device 200 transmits the identification information D via audio communication by use of a sound in the frequency band $B_2$, which is barely perceivable by the user, it is possible to notify each terminal device 300 of the identification information D without the user perceiving incongruity or discomfort. Furthermore, since the audio processing device 200 transmits (emits) the identification information D in a repetitive manner over the time length $T_2$, which exceeds the time length $T_D$, even if it is not possible to extract some of the identification information D of the second audio signal $S_2$, for example, due to interference of mixed noise components, the terminal device 300 can re-acquire the identification information D of other sections.

The time length $T_2$ of the second audio signal $S_2$ may be freely set in relation to the time length $T_G$ over which a sound (guidance voice) of the target signal $A_G$ is emitted. Any of the following configurations may be employed: a configuration in which the time length $T_2$ of the second audio signal $S_2$ is longer than the time length $T_G$ of the target signal $A_G$ ($T_2>T_G$); a configuration in which the time length $T_2$ of the second audio signal $S_2$ is shorter than the time length $T_G$ of the target signal $A_G$ ($T_2<T_G$); and a configuration in which the time length $T_2$ of the second audio signal $S_2$ is equal to the time length $T_G$ of the target signal $A_G$ ($T_2=T_G$). Since the sound of the second audio signal $S_2$ does not influence the user's hearing the guidance voice, as shown in FIG. 5, a possible configuration may be one in which the period (time length $T_2$) over which the sound of the second audio signal $S_2$ is emitted and the period (time length $T_G$) over which the sound (guidance voice) of the target signal $A_G$ is emitted overlap each other. In other words, it is possible to configure the two periods to at least partially overlap each other. In such a configuration, since, in parallel to the emission of the guidance voice, an audio signal that includes the identification information corresponding to the guidance voice is emitted, the terminal device 300 can acquire guidance information that corresponds to the notified identification information D more in real-time as compared to, for example, a configuration in which the identification information D is notified after the playback of the guidance voice ends. This is of a great advantage, especially in public transportation services, such as public buses, for which the target locations for guidance are continually changing. There is also an advantage in that the user can more readily recognize the relationship between his/her current location and the guidance information.

Figure 8:
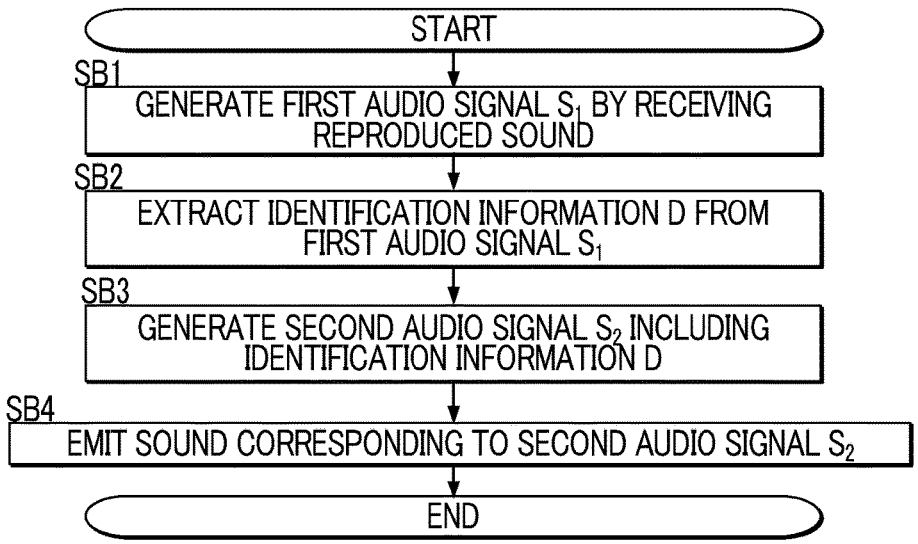
FIG. 8 is a flowchart showing a flow of an operation carried out in the audio processing device 200.

FIG. 8 is a flowchart showing the flow of the overall operation of the audio processing device 200. The processing of FIG. 8 is initiated, triggered by the sound emission device 130 emitting a reproduced sound of the reproduction signal $A_2$ that contains the modulation signal $A_D$ including the identification information D and the target signal $A_G$. The sound receiving device 202 generates the first audio signal $S_1$ by receiving the reproduced sound emitted from the sound emission device 130 (SB1). The information extractor 206 extracts the identification information D from the first audio signal $S_1$ (SB2). The signal processor 210 generates the second audio signal $S_2$ that is a signal including the identification information D and that is in the frequency band $B_2$ which is higher than the frequency band $B_1$ (SB3). The sound emission device 214 emits a sound (sound wave) indicated by the second audio signal $S_2$ (SB4).

Terminal Device 300

Figure 9:
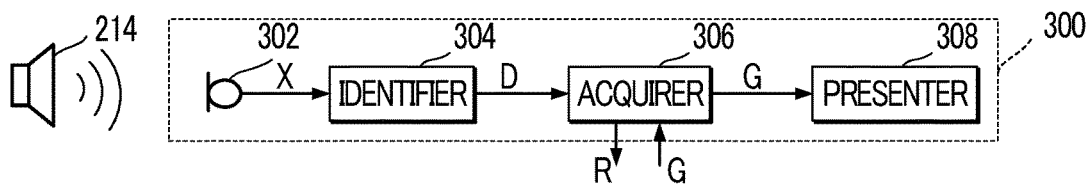
FIG. 9 is a block diagram showing a terminal device 300 of the first embodiment.

FIG. 9 is a block diagram showing a configuration of the terminal device 300. As shown in FIG. 9, the terminal device 300 includes a sound receiving device 302, an identifier 304, an acquirer 306, and a presenter 308. The sound receiving device 302 is an audio device (microphone) that receives surrounding sounds, and it receives a sound emitted from the sound emission device 214 of the audio processing device 200 and generates an audio signal (hereinafter, the "received sound") X that indicates a time waveform of the sound. The received signal X includes audio components of the identification information D. For convenience of explanation, an A/D converter that converts the received signal X generated by the sound receiving device 302 from analog to digital format is omitted from the figure.

The identifier 304 extracts the identification information D of the guidance voice by demodulating the received signal X generated by the sound receiving device 302. More specifically, the identifier 304 extracts the identification information D by emphasizing within the received signal X the band component of the frequency band $B_2$ including the identification information D, for example, by use of a high pass filter, and letting the band component pass a matched filter that uses, as a coefficient, the spread code used in spread modulation of the identification information D.

The acquirer 306 is a communication device that communicates with the guidance information server 500 via the communication network 400 (refer to FIG. 1). The communication scheme for deployment between the terminal device 300 and the guidance information server 500 may be freely selected, but typically, radio communication, for example, information communication that uses radio waves and infrared rays as a transmission medium, is employed that differs from the audio communication used for the audio processing device 200 to notify the terminal device 300 of the identification information D. The acquirer 306 transmits to the guidance information server 500 an information request R that includes the identification information D extracted from the received signal X by the identifier 304. The acquirer 306 receives the guidance information G transmitted from the guidance information server 500 responsive to the information request R.

Figure 10:
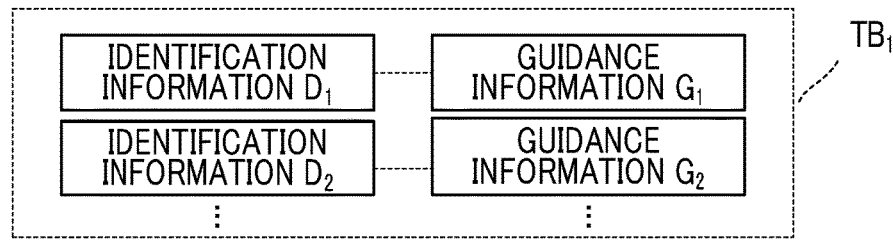
FIG. 10 is a diagram illustrative of a data structure of a guidance information table $TB_1$.

The guidance information server 500 possesses a guidance information table $TB_1$ shown in FIG. 10. The guidance information table $TB_1$ correlates identification information D ($D_1$, $D_2$ ...) with guidance information G ($G_1$, $G_2$ ...). The guidance information server 500, when it receives the information request R including the identification information D from the terminal device 300, reads guidance information G in the guidance information table $TB_1$ that corresponds to the identification information D in the information request R, and transmits to the terminal device 300, which is the transmitter of the information request R, the guidance information G. The presenter 308 of FIG. 9 presents to the user the guidance information G acquired by the acquirer 306, for example, by causing the guidance information G to be displayed on a display device.

Figure 11:
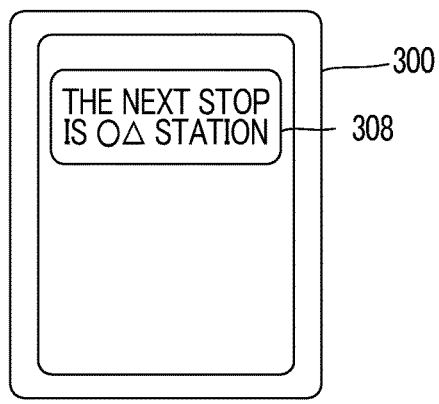
FIG. 11 is a diagram illustrating a display example of guidance information presented in a presenter 308.

FIG. 11 is a diagram explaining an example display of the guidance information G by the presenter 308. In FIG. 11, an example is shown in which the guidance information G is presented on the presenter 308 of the terminal device 300 as characters indicating the spoken content of the guidance voice. As exemplified in FIG. 11, the user can visually recognize the guidance information G (guidance on the next stop in the example shown in the figure) that is presented on the presenter 308. As will be understood from the foregoing explanation, the user can hear the guidance voice emitted from the sound emission device 130 of the reproduction system 100 and also can read, i.e., recognize by sight the guidance information G presented on the presenter 308. According to the above configuration, it is possible to provide the user with the guidance information G in a manner that is both audibly and visually clear. Also, a hearing-impaired person (a person with hearing disability) can recognize the content of the guidance voice.

In the first embodiment, the audio processing device 200 includes the sound receiving device 202 and the sound emission device 214. While it receives, using the sound receiving device 202, the reproduction signal $A_2$ emitted from the sound emission device 130 of the reproduction system 100, it emits, using the sound emission device 214, the second audio signal $S_2$ including the identification information D extracted from the first audio signal $S_1$. According to the above configuration, it is possible to notify a terminal device 300 of the identification information D via audio communication that uses the frequency band $B_2$ by disposing the audio processing device 200 close to the reproduction processing device 120, without changing the reproduction system 100 to include a module (signal processor 210) that converts an audio component including the identification information D within the reproduction signal $A_2$ from the frequency band $B_1$ to the frequency band $B_2$.

In the above explanation, an example is given in which the filter 108 of the reproduction system 100 suppresses the frequency band $B_2$ in the higher range. The cause of the frequency band $B_2$ being suppressed in a sound emitted from the sound emission device 130 is not limited to this processing by the filter 108. For example, even in a configuration in which there is no filter 108, it is still possible to suppress in the frequency band $B_2$ the sound emitted from the sound emission device 130 if, for example, the sound emission device 130 is acoustically characterized in that it has difficulty emitting a sound in a high frequency sound range that includes the frequency band $B_2$. Moreover, it is also possible to use a sound emission device that is capable of emitting the frequency band $B_2$, although realistically, not all existing devices on carriages C of a public bus service, and the like can be readily upgraded. It is also possible for the frequency band $B_2$ to be suppressed if a sampling frequency of the target signal $A_G$ is too low to include the frequency band $B_2$ as a target for reproduction. Regardless of how the frequency band $B_2$ is suppressed, employing the audio processing device of the first embodiment will still enable the transmission of the identification information D via audio communication by using the frequency band $B_2$.

The sound represented by the second audio signal $S_2$ is played over the time length $T_2$ that is longer than the time length $T_D$ over which the sound of the modulated signal $A_D$ is emitted. If the notification sound that includes the identification information D is overly long as compared to, for example, the guidance voice, there is a possibility that the user will perceive auditory incongruity or discomfort. In the first embodiment, the time length $T_D$ over which the notification sound including the identification information D is emitted is configured to be shorter than the time length $T_2$ of the second audio signal $S_2$, and thus, it is possible to reduce the number of cases in which the user will perceive auditory unnaturalness or discomfort.

Second Embodiment

Description of a second embodiment of the present invention will be given in the following. With respect to elements in the below exemplified embodiment effects and functions of which are the same as those of the first embodiment are denoted by same reference signs as used in explaining the first embodiment, and detailed explanation thereof is omitted as appropriate.

Figure 12:
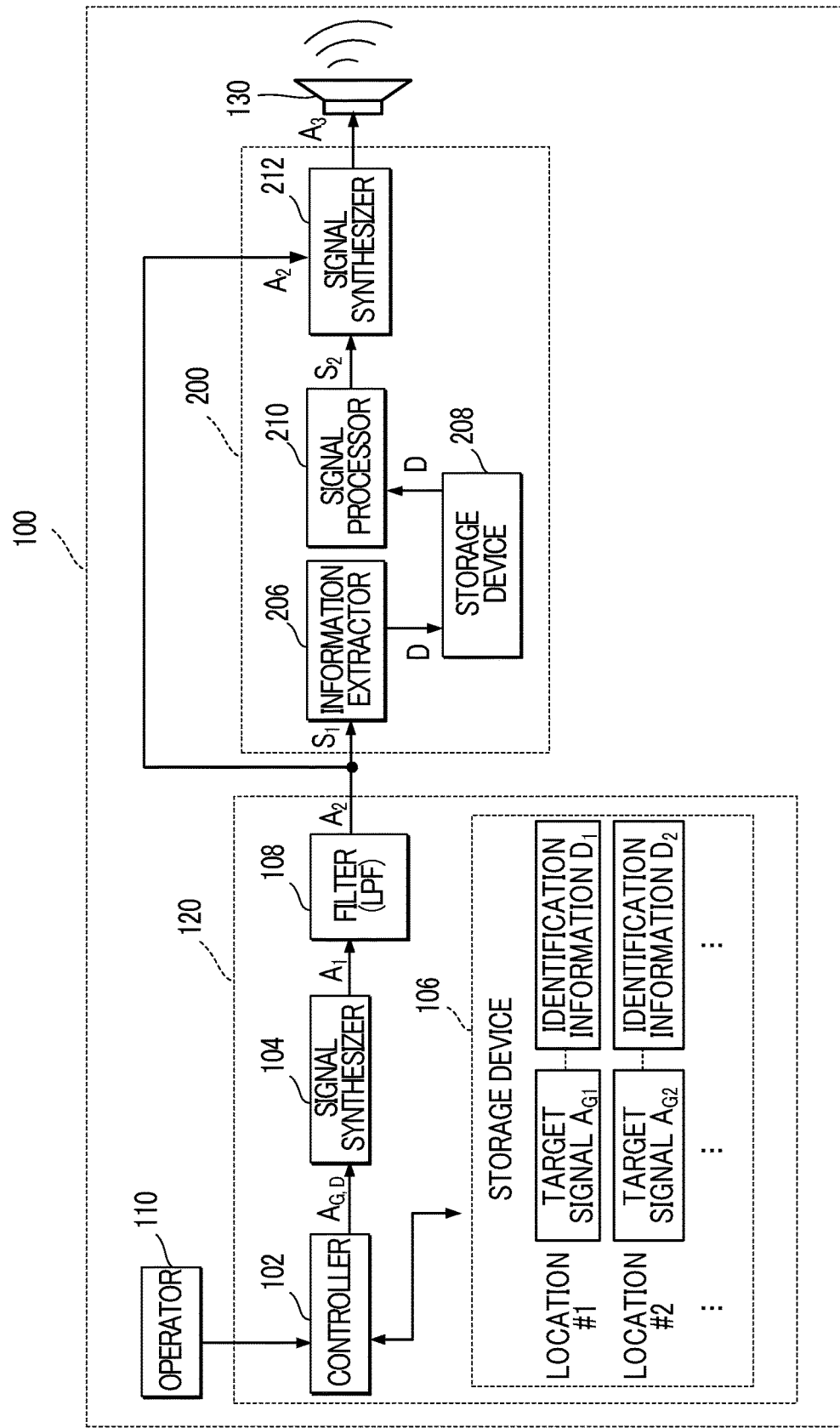
FIG. 12 is a block diagram showing the reproduction system 100 of a second embodiment.

FIG. 12 is a block diagram indicating a configuration of a reproduction system 100 of the second embodiment. In the first embodiment, an example is given in which the audio processing device 200 is arranged close to the sound emission device 130 of the reproduction system 100. As exemplified in FIG. 12, in the second embodiment, the audio processing device 200 is arranged on a signal line between the reproduction processing device 120 and the sound emission device 130 within the reproduction system 100. A reproduction signal $A_2$ is supplied as the first audio signal $S_1$ via the signal line, from the reproduction processing device 120 that generates the reproduction signal $A_2$ including the target signal $A_G$ (audio component of the guidance voice) and the modulation signal $A_D$ (audio component including identification information D of the guidance voice).

As will be understood from FIG. 12, the audio processing device 200 of the second embodiment is configured with the sound receiving device 202 and the sound emission device 214 of the first embodiment omitted. At the same time, the audio processing device 200 of the second embodiment includes a signal synthesizer 212 that generates a reproduction signal $A_3$ by synthesizing (e.g., by addition) the reproduction signal $A_2$ emitted from the reproduction processing device 120 and the second audio signal $S_2$. According to the second embodiment, the first audio signal $S_1$ that has the frequency band $B_2$ suppressed by the filter 108 of the reproduction processing device 120 is supplied to the information extractor 206 of the audio processing device 200. The information extractor 206 of the audio processing device 200 extracts the identification information D from the first audio signal $S_1$ (corresponding to the reproduction signal $A_2$ of the first embodiment) in substantially the same way as in the first embodiment. The signal processor 210 generates, in substantially the same way as in the first embodiment, the second audio signal $S_2$ that includes, as an audio component in the frequency band $B_2$ in the higher range, the identification information D extracted by the information extractor 206. The second audio signal $S_2$ in the frequency band $B_2$ generated by the signal processor 210 is synthesized with the reproduction signal $A_2$ by the signal synthesizer 212, and is then emitted from the sound emission device 130. In other words, the sound emission device 130 may be understood as a sound emission means for emitting a sound represented by the reproduction signal $A_3$ obtained by synthesizing the reproduction signal $A_2$ with the second audio signal $S_2$. The terminal device 300 obtains the guidance information G by extracting the identification information D from a sound played by the sound emission device 130.

The above configuration has an advantage over the first embodiment in that it enables the configuration of devices to be simplified, since it is not necessary for the audio processing device 200 to include the sound receiving device 202 and the sound emission device 214. Furthermore, whereas in the first embodiment, it is necessary to ensure that the volume of the modulated signal $A_D$ is sufficiently high for the notification sound emitted from the reproduction system 100 to be accurately received by the audio processing device 200, in the second embodiment, it is possible to minimize the volume of the modulation signal $A_D$ as compared to the first embodiment since the reproduction processing device 120 and the audio processing device 200 are connected by wire. Moreover, unlike the first embodiment in which the notification sound represented by the modulated signal $A_D$ has to be an acoustically natural sound because it is actually emitted, in the second embodiment the necessary level of the volume of the modulated signal $A_D$ is reduced as described above, and thus the notification sound does not have to be an acoustically natural sound. It is of note that the above configuration can also be configured to include the sound emission device 214 of the audio processing device instead of the sound emission device 130 of the reproduction system 100.

Figure 13:
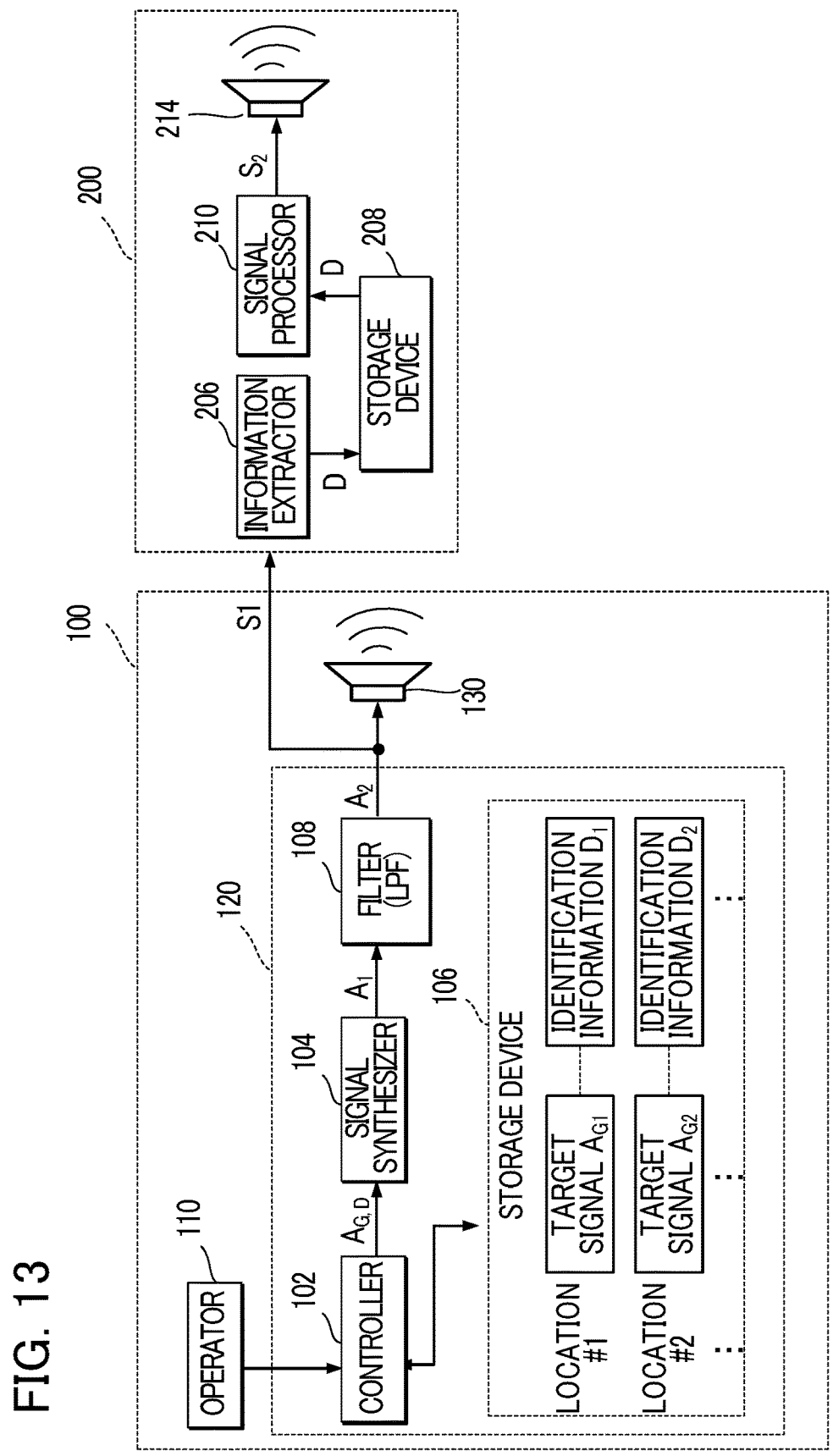
FIG. 13 is a block diagram showing a reproduction system 100 and an audio processing device 200 according to a modification of the second embodiment.

Instead of having the reproduction system 100 and the audio processing device 200 use the sound emission device 130 in common, as FIG. 13 shows, in this embodiment the reproduction system 100 may use the sound emission device 130, the audio processing device 200, and the sound emission device 214. In other words, the reproduction system 100 emits from the sound emission device 130 the reproduction signal $A_2$ that is emitted from the reproduction processing system 120. In the meantime, the audio processing device 200 extracts, using the information extractor 206, identification information D from the reproduction signal $A_2$ supplied by wire from the reproduction processing device 120 and outputs, from the sound emission device 214, the second audio signal $S_2$ generated by the signal processor 210 and that includes the identification information D. According to this configuration, substantially the same effects as the configuration shown in FIG. 12 can be obtained. An advantage is also obtained in that the device configuration is simplified since it is not necessary to carry out processing by the signal synthesizer 212 (synthesizing the second audio signal $S_2$ and the reproduction signal $A_2$).

Third Embodiment

The audio processing device 200 of the first embodiment transmits to the terminal device 300 the identification information D via audio communication that uses a sound as a transmission medium. The communication scheme through which the identification information D is notified to the terminal device 300, however, is not limited thereto. The audio processing device 200 of the third embodiment notifies the terminal device 300 of the identification information D by radio communication (e.g., near field communication) by use of electromagnetic waves, such as infrared rays or radio waves.

Figure 14:
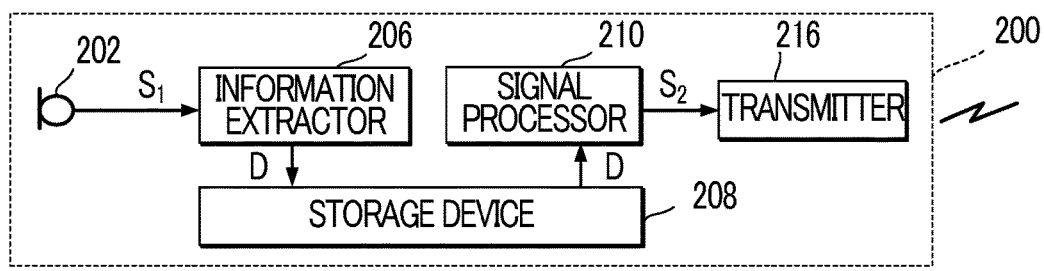
FIG. 14 is a block diagram showing an audio processing device 200 of a third embodiment.

FIG. 14 is a block diagram showing a configuration of an audio processing device 200 of the third embodiment. In FIG. 14, the sound emission device 214 of the first embodiment is replaced by a transmitter 216. The signal processor (transmission signal generator) 210 generates a transmission signal that includes identification information D extracted by the information extractor 206. The transmitter 216 is a communication device that transmits an electromagnetic wave that indicates the transmission signal generated by the signal processor 210. The identifier 304 of the terminal device 300 extracts the identification information D included in the received signal received from the audio processing device 200 and transmits to the guidance information server 500 the information request R including the identification information D, and then receives by return guidance information G. Substantially same effects as those of the first embodiment can be obtained by the above configuration.

It is also possible to configure the third embodiment in substantially the same manner as shown in FIG. 13 of the second embodiment. In other words, it is possible to employ a configuration in which the audio processing device 200 of the third embodiment does not include the sound receiving device 202 and in which a reproduction signal $A_2$ from the reproduction processing device 120 is supplied as a first audio signal $S_1$ to the audio processing device 200 via a signal line. According to this embodiment, it is possible to minimize the magnitude of a volume of the modulated signal $A_D$ compared to the above embodiment in which the reproduction signal $A_2$ (and eventually the first audio signal $S_1$) is acquired by the sound receiving device 202, since the reproduction processing device 120 and the audio processing device 200 are connected by wire. In addition, according to this embodiment, a required volume level of the modulated signal $A_D$ is reduced, and thus the modulated signal $A_D$ need not be an acoustically natural sound.

According to the configuration of the third embodiment, the terminal device 300 is required to be provided with a reception device that receives radio waves or infrared rays that are transmitted from the transmitter 216. In contrast, the first embodiment and the second embodiment have an advantage in that, because the identification information D is notified to the terminal device 300 via audio communication, the sound receiving device 302, which is used for voice calls and video recording, can also be used to receive the identification information D, and thus, there is no need for exclusive reception equipment to be adapted for use in the communication scheme of the transmitter 216.

Modifications

The different embodiments exemplified above may be modified in various manners. Specific modifications are described below as examples. Two or more embodiments that are freely selected from the below examples may be combined as appropriate, as long as they do not contradict one another.

(1) With respect to the reproduction system 100 of each of the abovementioned embodiments, an example configuration is described in which the signal synthesizer 104 generates a reproduction signal $A_1$ using a target signal $A_G$ and identification information D that have been stored in the storage device 106 in advance. However, it is also possible to prepare the reproduction signal $A_1$ in advance.

Figure 15:
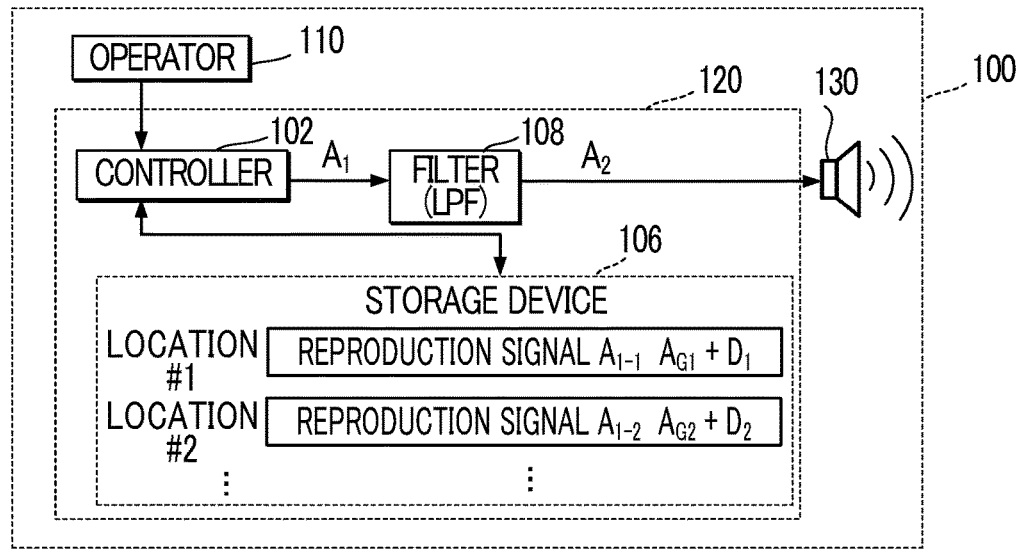
FIG. 15 is a block diagram showing a reproduction system 100 according to another modification.

FIG. 15 is a block diagram showing a configuration of a reproduction system 100 according to one modification. In the reproduction system 100 of FIG. 15, the signal synthesizer 104 exemplified in each of the abovementioned embodiments is omitted, and the reproduction signals A1 ($A_{1-1}$, $A_{1-2}$, $A_{1-3}$, . . . ) each of which indicate a synthesized sound of the target signal $A_G$ (guidance information) and the notification sound of the identification information D are stored in the storage device 106 in advance, for different locations of respective bus stops. Each reproduction signal $A_1$ that is stored in the storage device 106 is generated in advance in substantially the same way as carried out in the processing by the signal synthesizer 104 in each of the abovementioned embodiments. The controller 102 obtains a reproduction signal $A_1$ from the storage device 106 in response to an instruction from the driver $O_P$ and then supplies the reproduction signal $A_1$ to the filter 108. According to the above configuration, since it is not necessary to install a signal synthesizer 104 in the reproduction system 100, it is possible to simplify the configuration of the reproduction system 100, or to adopt an existing system in which there is no signal synthesizer 104.

(2) In the first embodiment, an example configuration (section (a) of FIG. 5) is described in which the modulation signal $A_D$ (notification sound) and a target signal $A_G$ (guidance voice) do not overlap along the time axis. However, it is also possible to have the modulated signal $A_D$ and the target signal $A_G$ overlap along the time axis. For example, a configuration may be selected in which the modulated signal $A_D$ is included in the beginning part of the target signal $A_G$. It is of note, however, that the emission of the modulated signal $A_D$ as a notification sound in the frequency band $B_1$ may inhibit audibility of the guidance voice corresponding to the target signal $A_G$. In view of this, a preferred configuration would be one in which a notification sound that is audible to the user is not used and in which the modulated signal $A_D$, an audio component including identification information D, is synthesized with the target signal $A_G$ in such a way as to be barely perceptible to a listener. For example, techniques such as audio watermarking or fingerprinting may be employed to synthesize or extract the identification information D corresponding to the target signal $A_G$.

(3) In each of the abovementioned embodiments, the audio processing device 200 is applied to the voice guidance system 1 of public bus services, but circumstances in which the audio processing device 200 can be applied are not limited to this example. For example, a configuration may be selected in which the audio processing device 200 is applied to onboard audio announcement systems on other public transportation services such as trains, or to reproduction systems in exhibition facilities. For example, a reproduced sound that is obtained by synthesizing identification information D with a target signal $A_G$ of a guidance voice that provides commentary about exhibits can be generated in a reproduction system in an exhibition facility and then received by the audio processing device 200. When a user carrying a terminal device 300 approaches a particular piece of work, a second audio signal $S_2$ in which the identification information D is synthesized is emitted alongside the guidance voice. The terminal device 300 that the user carries with him/her displays (or emits) guidance information G that is provided from the guidance information server 500 in response to an information request R that includes the identification information D, and it then becomes possible to recognize the guidance information.

(4) In each of the abovementioned embodiments, provision of characters representative of a guidance voice to the user is exemplified as the guidance information G, but the content of the guidance information G is not limited to this example. For example, any of the following may be provided to the terminal device 300 as guidance information G: characters and/or still or moving images indicative of information on public transportation services and facilities, such as user guides, facility guides, fares, and so forth; travel guides, such as stops, transfer locations, and so forth; and tourist information for local areas close to the guided location, such as tourist facilities, accommodation, area guides such as for historic sites, and so forth; characters that represent guidance voice, for example, characters to which a hearing-impaired person may refer to visually check guidance information; and/or sounds and/or characters that are obtained by translating the guidance information provided through the guidance voice into a foreign language. In a configuration in which tourist information is provided to the user as the guidance information G, it is possible to have a configuration in which coupons and the like that can be used in tourist and accommodation facilities are presented in the presenter 308 alongside the guidance information G.

(5) In the embodiments, an example configuration is described in which the acquirer 306 of the terminal device 300 communicates with the guidance information server 500 via the communication network 400 to transmit to the guidance information server 500 an information request R including identification information D so as to receive guidance information G transmitted from the guidance information server 500 in response to the information request R. However, the method by which the guidance information G is obtained by the terminal device 300 is not limited to this example. For example, a guidance information table TB$_1$ may be stored in a storage device of the terminal device 300, and the acquirer 306 may acquire the guidance information G corresponding to the identification information D from the storage device.

(6) In the embodiments, the voice guidance system 1 is shown by way of example as including the following devices each as a separate unit: the reproduction system 100; the audio processing device 200; the terminal device 300; and the guidance information server 500. However, the configuration of the devices contained in the voice guidance system 1 is not limited to this example. For example, a configuration such as the one in the modification (5) in which the terminal device 300 includes the function of the guidance information server 500 or a configuration such as the one in the second embodiment in which the reproduction system 100 and the audio processing device 200 are included in a single device may be selected.

(7) In each of the abovementioned embodiments, an example is described in which the guidance voice represent information on bus stops directed to the user of a public bus is played, but the kind of sound that is emitted by the sound emission device 130 of the reproduction system 100 is not limited to a guidance voice. For example, any of the abovementioned embodiments may be selected in a case in which different sounds such as music is played. As will be understood from the above explanation, the reproduction signal A$_2$ and the first sound audio signal S$_1$ related to each of the abovementioned embodiments are comprehensively expressed as a signal that indicates a sound to be reproduced (sound for reproduction).

According to the first embodiment, the sound emission device 214 emits a sound represented by the second audio signal S$_2$, and according to the second embodiment, either the sound emission device 130 or the sound emission device 214 emits a sound represented by a signal that is obtained by synthesizing the reproduction signal A$_2$ with the second audio signal S$_2$. Accordingly, the sound emission device 130 and the sound emission device 214 are comprehensively expressed as a sound emission means of the present invention. The sound emission means of the present invention is thus best understood as a means of emitting a sound represented by a signal that includes at least the second audio signal S$_2$, i.e., a sound represented by the second audio signal S$_2$.

(8) Programs according to the abovementioned embodiments may be provided in a format stored in a computer-readable recording medium, and installed in a computer. The recording medium is for example a non-transitory recording medium, and a preferable example thereof may be an optical recording medium (optical disc) such as a CD-ROM, but may also include a recording medium of a freely selected format that is publicly known, such as a semiconductor recording medium or a magnetic recording medium. The program of the present invention may be provided, for example, in a format distributed via a communication network and installed in a computer.

100 . . . reproduction system, 102 . . . controller, 104 . . . signal synthesizer, 106 . . . storage device, 108 . . . filter, 110 . . . operator, 130 . . . sound emission device, 1042 . . . modulation processor, 1044 . . . synthesis processor, 200 . . . audio processing device, 202 . . . sound receiving device, 206 . . . information extractor, 208 . . . storage device, 210 . . . signal processor, 212 . . . signal synthesizer, 214 . . . sound emission device, 300 . . . terminal device, 302 . . . sound receiving device, 304 . . . identifier, 308 . . . presenter, 500 . . . guidance information server.

The invention claimed is:

1. An audio processing device communicable with a communication device via sound waves, the audio processing device comprising:
    a microphone that captures first audio sound, output by a first sound emitter, as sound waves, that includes:
        a first audio component of sound of guidance voice; and
        a second audio component of notification sound associated with the guidance voice,
        wherein the microphone outputs a first audio signal representing the captured first audio sound;
    an information extractor configured to extract the second audio component, in a first frequency band, from the first audio signal;
    an audio signal processor configured to generate a second audio signal representing the second audio component extracted by the information extractor, in a second frequency band, an upper limit of the second frequency band being higher than an upper limit of the first frequency band; and
    a second sound emitter configured to output second audio sound, as sound waves, representing the second audio signal, while the first sound emitter is outputting, as sound waves, the first audio sound representing the first audio component, to communicate with the communication device, without disrupting recipient's ability to hear the first audio sound representing the first audio component output by the first sound emitter, as sound waves.

2. The audio processing device according to claim 1, wherein a length of time over which the second audio sound representing the second audio signal emitted by the second sound emitter, as sound waves, is longer than a length of time over which the first audio sound representing the second audio component output by the first sound emitter, as sound waves.

3. The audio processing device according to claim 1, wherein a period in which the second audio sound representing the second audio signal emitted by the second sound emitter, as sound waves, and a period in which the first audio sound representing the first audio component emitted by the first sound emitter, as sound waves, overlap.

4. An audio processing device communicable to a communication device, the audio processing device comprising:
    a microphone that captures audio sound, output by a sound emitter, as sound waves, that includes:
        a first audio component of sound of guidance voice; and
        a second audio component of notification sound associated with the guidance voice,
        wherein the microphone outputs an audio signal representing the captured audio sound;
    an information extractor configured to extract the second audio component from the audio signal;
    a transmission signal processor configured to generate a transmission signal representing the second audio component extracted by the information extractor; and
    a transmitter configured to output electromagnetic waves representing the transmission signal, while the sound emitter is outputting the audio signal representing the first audio component, as sound waves, to communicate with the communication device, without disrupting recipient's ability to hear the audio sound representing the first audio component output by the sound emitter, as sound waves,
wherein a length of time over which the electromagnetic waves representing the transmission signal transmitted by the transmitter is longer than a length of time over which the audio sound representing the first audio component output by the sound emitter, as sound waves, to provide the recipient more time to receive the notification from the communication device.

5. An information providing method for an audio processing device communicable with a communication device via sound waves, the method comprising the steps of:
capturing, with a microphone, first audio sound, output by a first sound emitter, as sound waves, that includes:
a first audio component of sound of guidance voice; and
a second audio component of notification sound associated with the guidance voice,
wherein the microphone outputs a first audio signal representing the captured first audio sound;
extracting the second audio component, in a first frequency band, from the first audio signal;
generating a second audio signal representing the extracted second audio component, in a second frequency band, an upper limit of the second frequency band being higher than an upper limit of the first frequency band; and
emitting, via a second sound emitter, second audio sound, as sound waves, representing the second audio signal, while the first sound emitter is outputting, as sound waves, the first audio sound representing the first audio component, to communicate with the communication device, without disrupting recipient's ability to hear the first audio sound representing the first audio component output by the first sound emitter, as sound waves.

6. The information providing method according to claim 5, further comprising the step of:
emitting the first audio component after emitting the second audio component,
wherein a period in which the second audio sound representing the second audio signal emitted by the second sound emitter, as sound waves, and a period in which the first audio sound representing the first audio component emitted by the first sound emitter, as sound waves, overlap.

7. An information providing method for an audio processing device communicable with a communication device, the method comprising the steps of:
capturing, with a microphone, audio sound, output by a sound emitter, as sound waves, that includes:
a first audio component of sound of guidance voice; and
a second audio component of notification sound associated with the guidance voice,
wherein the microphone outputs an audio signal representing the captured audio sound;
extracting the second audio component from the audio signal;
generating a transmission signal representing the extracted second audio component; and
outputting electromagnetic waves representing the transmission signal, while the sound emitter is outputting the audio signal representing the first audio component, as sound waves, to communicate with the communicable device, without disrupting recipient's ability to hear the audio sound representing the first audio component output by the sound emitter, as sound waves,
wherein a length of time over which the electromagnetic waves representing the transmission signal transmitted is longer than a length of time over which the audio sound representing the first audio component output by the sound emitter, as sound waves, to provide the recipient more time to receive the notification.

8. An audio processing device for communicating with a communication device using sound waves, the audio processing device comprising:
an information extractor configured to:
receive a first audio signal that includes a first audio component of sound of guidance voice and a second audio component of notification sound associated with the guidance voice; and
extract the second audio component, in a first frequency band, from the received first audio signal;
an audio signal processor configured to generate a second audio signal representing the second audio component extracted by the information extractor, in a second frequency band, an upper limit of the second frequency band being higher than an upper limit of the first frequency band; and
a sound emitter configured to output, while first audio sound representing the first audio component of the first audio signal is being output as sound waves, second audio sound, as sound waves, representing the second audio signal, to communicate with the communication device, without disrupting recipient's ability to hear the first audio sound.

9. The audio processing device according to claim 8, wherein the sound emitter also emits the first audio sound representing the first audio component of the first audio signal as sound waves.

10. The audio processing device according to claim 8, wherein another sound emitter, different from the sound emitter, emits the first audio sound representing the first audio component of the first audio signal as sound waves.

11. An audio processing device communicable to a communication device, the audio processing device comprising:
an information extractor configured to:
receive an audio signal that includes a first audio component of sound of guidance voice and a second audio component of notification sound associated with the guidance voice; and
extract the second audio component from the received audio signal;
a transmission signal processor configured to generate a transmission signal representing the second audio component extracted by the information extractor;
a transmitter configured to output electromagnetic waves representing the transmission signal, while audio sound representing the first audio component is being output as sound waves, to communicate with the communication device, without disrupting recipient's ability to hear the audio sound,
wherein a length of time over which the electromagnetic waves representing the transmission signal transmitted by the transmitter is longer than a length of time over which the audio sound representing the first audio component is output, to provide the recipient more time to receive the notification from the communication device.

12. The audio processing device according to claim 11, wherein the information extractor receives the audio signal, via a signal line, from a reproduction processing device that generates the audio signal.

13. The audio processing device according to claim 11, wherein the audio sound representing the first audio component is output as sound waves from a sound emitter of a reproduction processing device that generates the audio signal.

14. An information providing method for an audio processing device communicable with a communication device via sound waves, the method comprising the steps of:
receiving a first audio signal that includes a first audio component of sound of guidance voice and a second audio component of notification sound associated with the guidance voice;
extracting the second audio component, in a first frequency band, from the received first audio signal;
generating a second audio signal representing the extracted second audio component, in a second frequency band, an upper limit of the second frequency band being higher than an upper limit of the first frequency band; and
outputting, via a sound emitter, while the first audio sound representing the first audio component of the first audio signal is being output as sound waves, second audio sound, as sound waves, representing the second audio signal to communicate with the communication device, without disrupting recipient's ability to hear the first audio sound.

15. An information providing method for an audio processing device communicable with a communication device, the method comprising the steps of:
receiving an audio signal that includes a first audio component of sound of guidance voice and a second audio component of notification sound associated with the guidance voice;
extracting the second audio component from the received audio signal;
generating a transmission signal representing the extracted second audio component; and
outputting electromagnetic waves representing the transmission signal, while audio sound representing the first audio component is being output as sound waves, to communicate with the communication device, without disrupting recipient's ability to hear the audio sound,
wherein a length of time over which the electromagnetic waves representing the transmission signal transmitted is longer than a length of time over which the audio sound representing the first audio component is output, to provide the recipient more time to receive the notification from the communication device.

* * * * *